United States Patent
Blackmon et al.

(10) Patent No.: US 6,895,482 B1
(45) Date of Patent: May 17, 2005

(54) REORDERING AND FLUSHING COMMANDS IN A COMPUTER MEMORY SUBSYSTEM

(75) Inventors: Herman Lee Blackmon, Rochester, MN (US); Robert Allen Drehmel, Goodhue, MN (US); Kent Harold Haselhorst, Byron, MN (US); James Anthony Marcella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,011

(22) Filed: Sep. 10, 1999

(51) Int. Cl.[7] .............................................. G06F 12/00
(52) U.S. Cl. ...................... 711/158; 711/151; 710/112; 710/244
(58) Field of Search .............................. 711/112, 151, 711/154, 158, 159, 167; 710/5, 7, 20, 28, 112, 244; 709/103

(56) References Cited

U.S. PATENT DOCUMENTS

| | | | | |
|---|---|---|---|---|
| 5,729,718 A | * | 3/1998 | Au ............................. | 711/167 |
| 6,047,334 A | * | 4/2000 | Langendorf et al. ........... | 710/5 |
| 6,088,772 A | * | 7/2000 | Harriman et al. ........... | 711/158 |
| 6,145,052 A | * | 11/2000 | Howe et al. ................. | 711/112 |
| 6,363,466 B1 | * | 3/2002 | Anand ....................... | 710/112 |
| 6,385,708 B1 | * | 5/2002 | Stracovsky et al. ......... | 709/103 |
| 6,453,370 B1 | * | 9/2002 | Stracovsky et al. ........... | 710/17 |
| 6,601,151 B1 | * | 7/2003 | Harris ........................ | 711/158 |

* cited by examiner

Primary Examiner—Pierre M. Vital
(74) Attorney, Agent, or Firm—Karuna Ojanen

(57) ABSTRACT

An improved computer memory subsystem determines the most efficient memory command to execute. The physical location and any address dependency of each incoming memory command to a memory controller is ascertained and that information accompanies the command for categorization into types of command. For each type of memory command, there exists a command FIFO and associated logic in which a programmable number of the memory commands are selected for comparison with each other, with the memory command currently executing, and with the memory command previously chosen for execution. The memory command having the least memory cycle performance penalty is selected for execution unless that memory command has an address dependency. If more than one memory command of that type has the least memory cycle performance penalty, then the oldest is selected for execution. Memory commands of that type are selected for execution each subsequent cycle until a valid memory command of that type is no longer available, or until a predetermined number has been executed, or until a memory command of another type has higher priority. If an address dependency exists between memory commands of different types, then memory commands of the same type of the oldest memory command is executed to avoid deadlock.

8 Claims, 16 Drawing Sheets

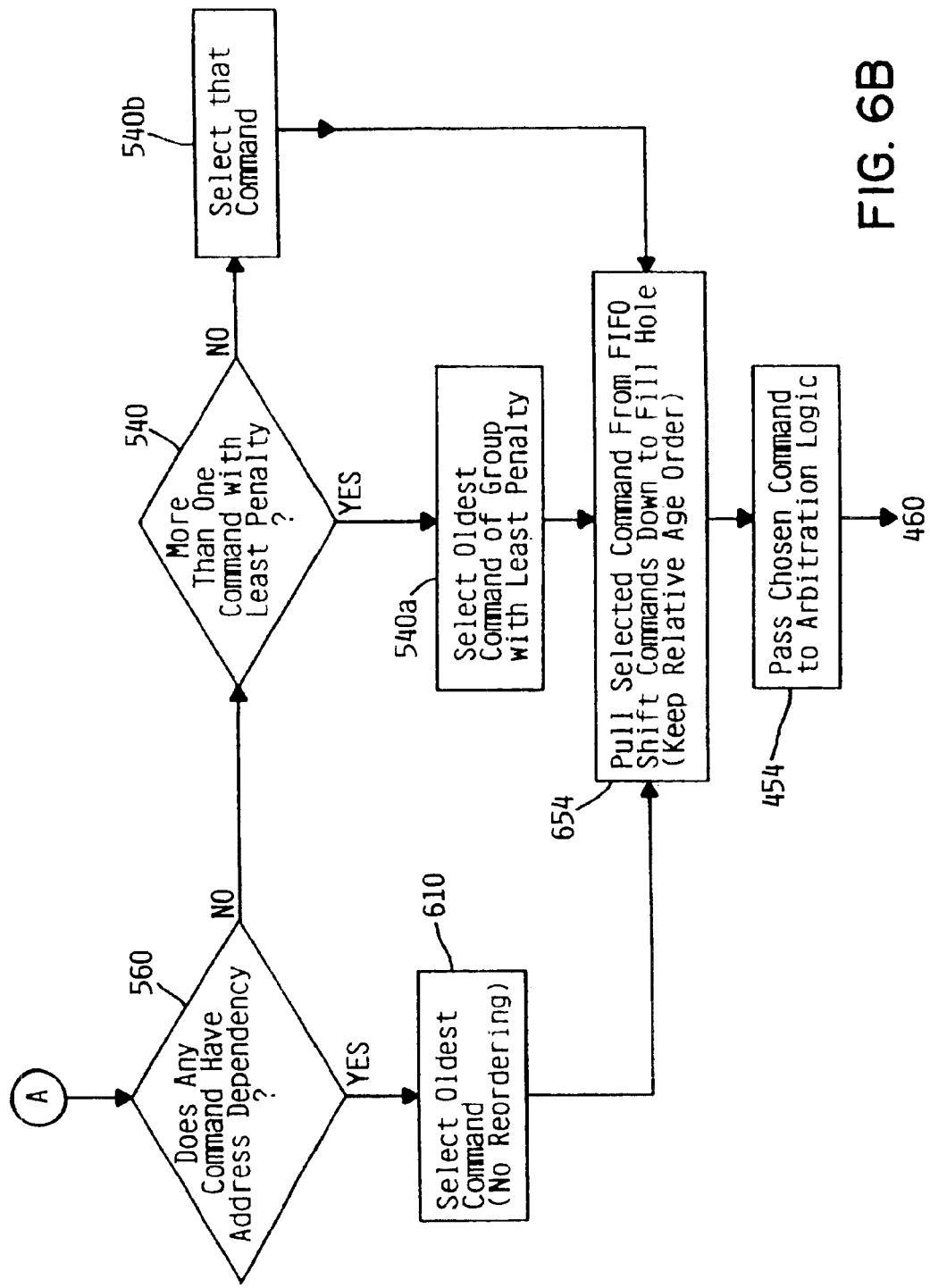

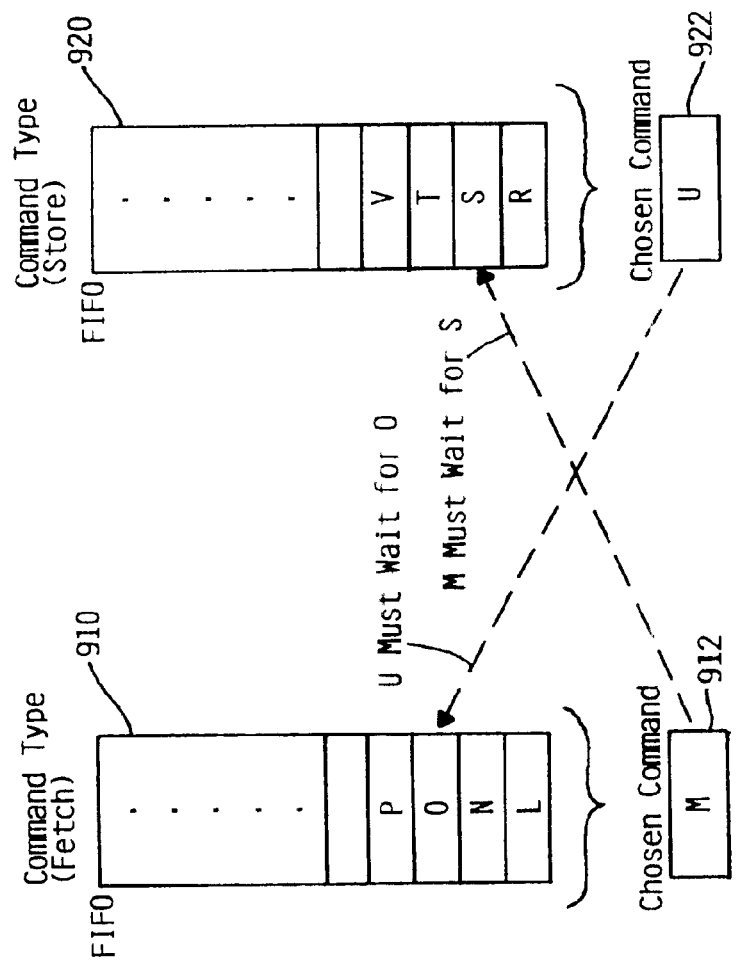

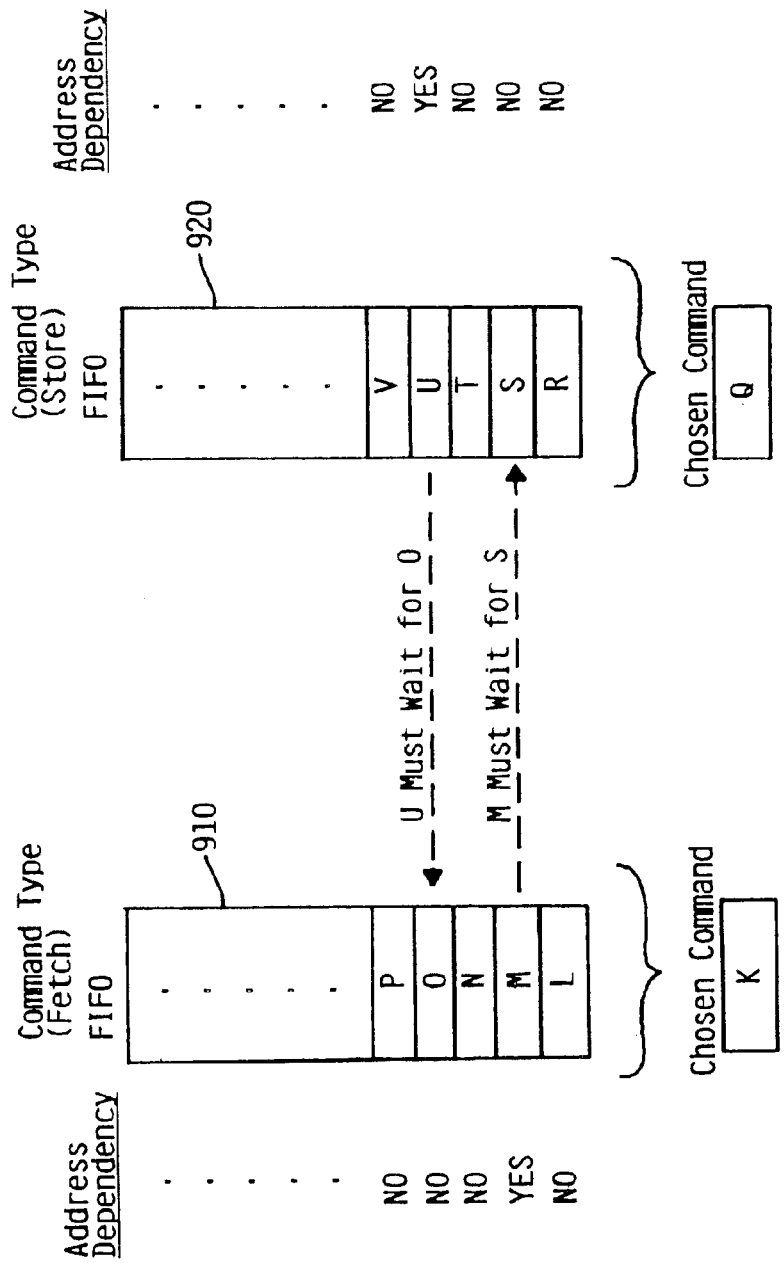

REORDERING AND FLUSHING COMMANDS IN A COMPUTER MEMORY SUBSYSTEM

TECHNICAL FIELD

This invention relates generally to the field of computer memory management and more particularly, relates to an apparatus and method to improve performance of computer memory subsystems by first reordering commands according to performance penalties and then allowing a programmable number of the same type of command to execute before other types of commands.

BACKGROUND OF THE INVENTION

The endeavor for faster and faster computers have reached remarkable milestones since their inception and coming of age during the past sixty years. The beginning of the computer age was characterized by connecting vacuum tubes with large coaxial cables for wiring analog logic. If a new problem was to be solved, the cables were reconfigured. Today, coaxial cables have been replaced with high speed data buses and vacuum tubes have been replaced with high speed logic having transistors of new semiconductor materials and designs, all of which are limited only by the laws of physics.

Initially, the slowest subsystem of computers was the processor subsystem. As processors became more efficient, the limiting function of the computer became the time required to obtain data from sources outside the computer. Data was then moved into the computer and the limitation became the time required for the computer processor to retrieve data stored in its memory which was still external to the processor.

To improve the performance of memory subsystems, memory was brought closer to the processor in the form of cache hierarchies. Cache hierarchies, which are nothing more than limited volume very high-speed memories were contrived and incorporated into the same integrated circuit as the processor. Thus, data would be immediately available to the processor. But the bulk of the data and operating programs were still stored in a larger memory within the computer, referred to as main memory. Efforts were directed toward making this main memory subsystem more efficient. New faster semiconductor materials were developed and used in the RAM—random access memory. More efficient circuits and methods of row and column addressing were developed. The main memory was connected to the processor and other I/O devices through more efficient buses and sophisticated bus command logic. Soon memory control logic became almost as complicated as the logic within the central processing unit having the processor and the cache hierarchy. Memory refresh circuits were developed to maintain the "freshness" and hence the accuracy of the data within main memory. Compression/decompression engines were developed to efficiently rearrange stored data.

Still other techniques to improve memory subsystem performance include overlapping and interleaving commands to the memory devices. Interleaving to route commands on different memory buses or different memory cards was improved by providing additional memory in the form of devices or more memory banks. But interleaving more devices or more banks requires more I/0 pins, more power, and more cost to the entire system to interconnect the memory banks. The amount of data processed with each access to memory was increased to improve memory bus utilization. Similarly the data bus width could be narrowed, but a decreased bandwidth would decrease overall performance. Memory subsystem performance has improved as a result of all these improvements but it still remains a slower aspect of computer processing in which memory clocks typically operate two to four times slower than processor clocks.

There thus remains a need to improve memory subsystem performance without additional cost while still maintaining high bandwidth and high data bus utilization.

SUMMARY OF THE INVENTION

These needs and others that will become apparent to one skilled in the art are satisfied by a method to improve memory subsystem performance by processing commands in a computer memory subsystem, wherein the method comprises receiving a plurality of commands on a bus connected to the memory subsystem; categorizing the received commands into command types; determining memory cycle performance penalties of the categorized commands; reordering the categorized commands so that the commands having the least memory cycle performance penalty are selected for execution; determining if the reordered commands are valid; arbitrating the valid commands; and executing sequential valid commands of the same command type.

The command types may be categorized into forms of store and fetch operations. The command types may also be associated with a particular source or destination of the received memory commands, such as a particular computer processor connected on the bus network; or an I/O hub controller functionally connected on the bus network; or a switching fabric connected to the bus network; or a compression/decompression engine functionally connected to the bus network. The command types may also originate from or are required for a particular application. If any of the received commands have an address dependency, that information is determined and passed along with the memory command.

Determining memory cycle performance penalties of the categorized commands may further comprise comparing a number of oldest received categorized commands with each other and/or with a currently chosen command, and/or with a previously chosen command. The oldest of the categorized commands that have the least memory cycle performance penalty is selected for execution. Arbitrating the reordered valid commands may further comprise granting priority to the type of command having the least memory cycle performance penalty. Alternatively, arbitrating the reordered valid commands may further comprise granting priority to a command type other than the command type of the reordered valid commands. Valid commands of the same command type as the command having the least memory cycle performance penalty are executed sequentially until a valid command of that command type is no longer available, or until a predetermined number has been executed, or until a command of another command type has higher priority.

Another embodiment may be described as a method to process commands in a computer memory subsystem, wherein the method comprises receiving a plurality of memory commands on a bus connected to the computer memory subsystem and determining the physical location of the memory command in memory and if any of the received commands have an address dependency and then passing these determinations along with the memory command; categorizing the received commands into command types based on one of the following: STORE, FETCH, INTER- VENTION STORE, the source or destination of the received memory commands, the program or application from which the memory commands originate or are otherwise required. The method further comprises determining memory cycle performance penalties of the categorized commands by comparing a number of oldest received categorized commands with each other, with a currently chosen command, and with a previously chosen command; reordering the categorized commands so that the categorized command having the least memory cycle performance penalty is selected for execution and if more than one categorized command has the least memory cycle performance penalty, then selecting the oldest; determining if the reordered commands are valid; granting priority to the type of command having the least memory cycle performance penalty; executing sequential valid commands of the same command type until a valid command of the same type is not received or until a predetermined number has been executed, or until a memory command of another type has higher priority; avoiding deadlock when an address dependency exists between commands of different types by executing commands having the command-type of the oldest memory command.

Another aspect of the invention is a method of processing memory commands in a computer processing system having at least one command source on a bus connected to a memory controller, the method comprising selecting a memory command having the least memory cycle performance penalties to execute and then executing a programmable number of other valid memory commands of that type.

A computer processing system is provided which comprises a plurality of bus units, wherein the bus units further comprise at least one computer processor, at least one I/O device; at least one memory cache system connected to the computer processor; and at least one network communication device, the plurality of bus units being interconnected on a bus network and capable of issuing memory commands categorized into types; at least one memory subsystem connected to the bus units on a first bus, the memory subsystem responsive to the memory commands and further comprising: a memory controller connected to a command interface functionally connected to the first bus; a plurality of memory chips configured into memory banks; the memory chips architected into memory cards attached to at least one memory bus; a plurality of command FIFO queues, each command FIFO queue associated with one command type into which the memory commands are categorized; a plurality of comparison logic circuits, each comparison logic circuit associated with one of the command FIFO queues to determine which memory commands of each of the command types have the least memory cycle performance penalty; an arbitration logic circuit to output the memory commands of the command type having the least memory cycle performance penalty to the memory chips. The comparison logic circuit further determines the oldest memory command in each command FIFO queue.

Another aspect of the invention is a computer memory controller, comprising means to receive a plurality of types of memory commands from a plurality of command sources; means to determine the memory cycle performance penalty associated with each memory command of each type; means to compare the memory commands of one type with other memory commands of the same type, with a current chosen memory command of the same type, and with a previously chosen memory command of the same type to determine which of the memory commands have the least memory cycle performance penalty; means to select the oldest of the memory commands having the least memory cycle performance penalty; and means to continue execution of memory commands of the same type as the selected memory command.

Further scope of applicability of the present invention will become apparent from the detailed description given herein. It should be understood, however, that the detailed description and the specific examples, while indicating preferred embodiments of the invention, are given by way of illustration only. Various changes and modifications within the spirit and scope of the invention will become apparent to those skilled in the art upon review of the detailed description.

BRIEF DESCRIPTION OF THE DRAWING

The present invention will become more fully understood from the detailed description and accompanying drawings, wherein:

FIGS. 9a and 9b are illustrations of how deadlock can occur with command reordering and how deadlock can be avoided using address dependency information in accordance with principles of the invention.

DETAILED DESCRIPTION OF THE PREFERRED EMBODIMENTS

Figure 1:
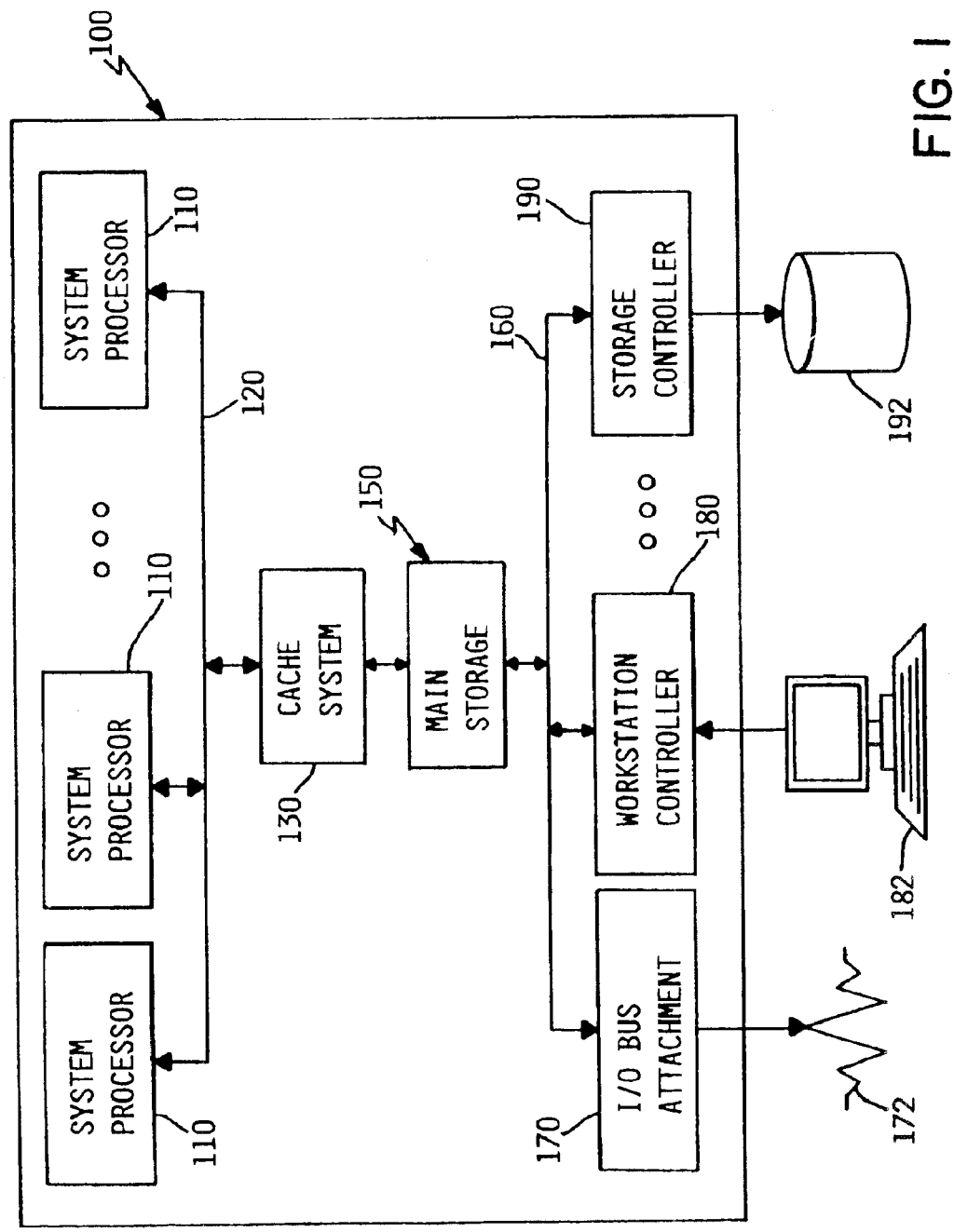
FIG. 1 is a simplified block diagram of a basic computer architecture capable of implementing the invention.

Referring to the figures wherein like numerals refer to the same or similar elements throughout and in particular with reference to FIG. 1, a simplified block diagram of a computer system 100 incorporating a memory subsystem 150 which may operate in accordance with principles of the invention is illustrated. Such a computer system 100 typically comprises at least one system processor 110 having many functional units to perform operations on data via instructions. An example of a system processor is the PowerPC which uses a reduced instruction set architecture. A system processor 110 may be connected to other system processors 110 using an internal bus network 120. Connected to the system processors 110 via the internal bus 120 is a cache system 130 employing high speed memory nearer the processor 110 for the storage of data and instructions that are quickly accessed by the processor. Cache system 130 may typically comprise a level one data cache, a level two data and instruction cache and may also have intermediate caches or other level of caches to store data and/or instructions. Although cache system 130 is shown external to each processor 110; each processor 110 may have its own cache system 130 on the same integrated circuit with the processor 110. Connected to the cache system 130 is main storage memory subsystem 150.

Main storage 150 typically comprises an array of memory cards which interact with the cache system 130 and through an external bus 160, with various input/output (I/O) devices for the transfer of data and instructions. Typically within the computer system 100, these I/O devices may include an I/O bus attachment 170 for communication with an external network 172 using specified protocols such as Ethernet, PCI, TCP/IP, etc. Other examples of the external network 172 include a limited network within a company or a specified configuration or an unlimited network such as the Internet. Workstation controller 180 may be connected to other computer systems which are similar to its own computer system or may be connected to a larger computer/server in which case the computer system 100 would be considered a client. On the other hand and even at the same time, the computer system 100 may be configured to be a server to provide operating systems and client programs for other clients by interacting with other workstations 182 through workstation controller 180 or over the I/O bus attachment 170. Typically, the computer system 100 may also be connected to external memory storage 192, such as a disk drive or tape drive, through a storage controller 190. Any functional unit attached to either an internal or an external bus may herein be referred to as a bus unit. Examples of bus units then include processors, I/O hub controllers, compression engines, external storage device controllers, workstation controllers, etc.

Figure 2:
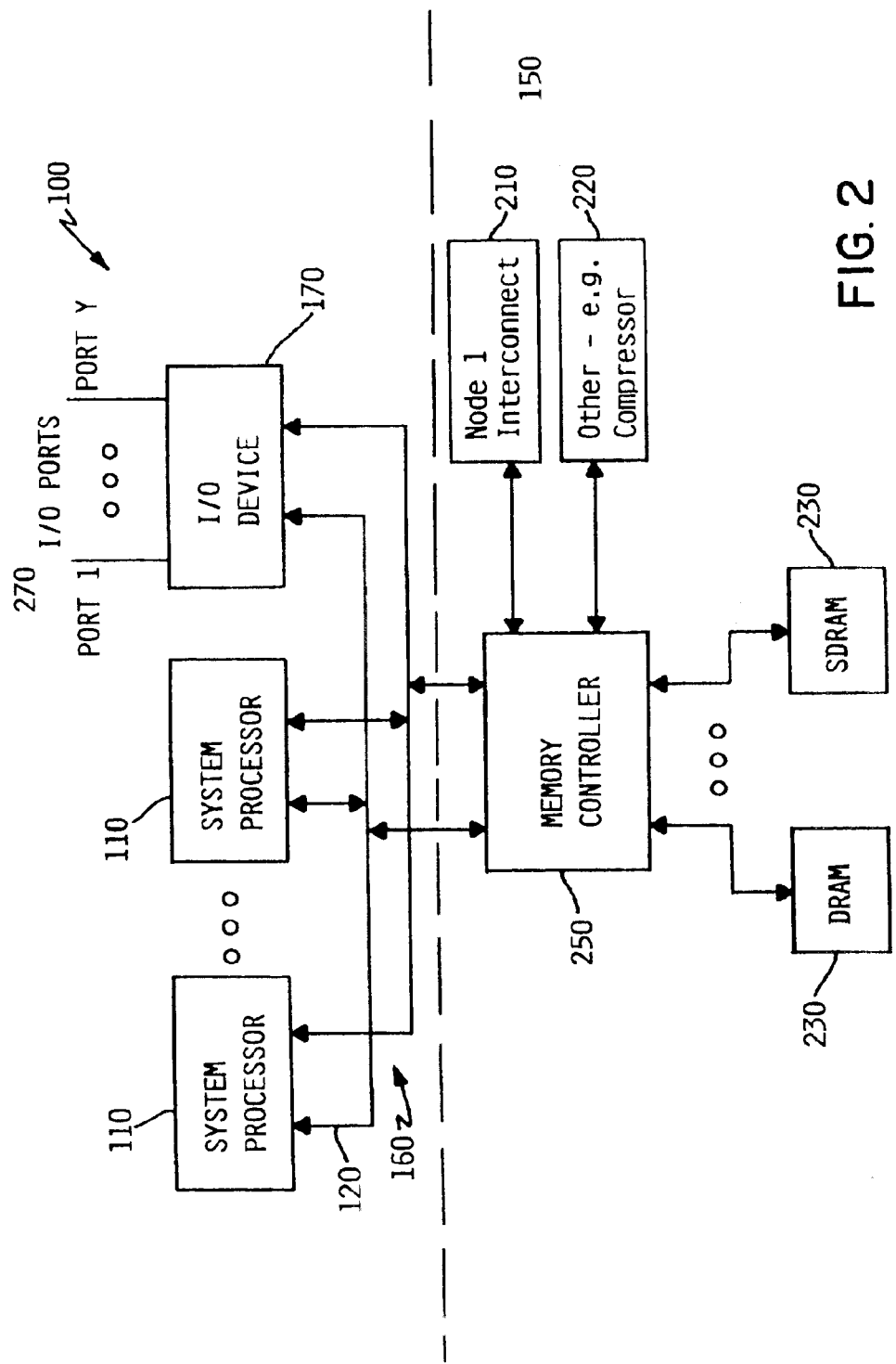
FIG. 2 is a simplified block diagram of a memory subsystem in relationship to a computer system.

FIG. 2 depicts elements of the computer system 100 in a configuration somewhat modified from that of FIG. 1. FIG. 2 illustrates portions of the main storage memory subsystem 150 in more detail. Main storage, referred to herein simply as the memory subsystem 150, is suitable for connection to a computer information processing system 100 and provides large amounts of storage to be accessed at high speed by the host computer information processing system 100. The main functional units of the memory subsystem 150 are the memory controller 250 and a plurality of random access memory cards 230 in which data and programs are stored during the operation of the computer data processing system 100. Each of the memory cards 230 of memory subsystem 150 comprises an array of DRAM, SDRAM, or SRAM memory chips. The memory architecture is a hierarchy related to the proximity to one another. First, memory arrays on the same chip are configured into banks. Several or many memory chips may be physically located and interconnected with each other on the same memory card. All or some of the memory cards may be interconnected on a memory bus, of which there may be several memory buses. Memory controller 250 manages the transfer of data and other information to and from the memory subsystem 150 at high speed and determines first which memory bus, then which memory card on that bus, then which memory chip on that memory card and lastly which memory bank on that memory chip is associated with a memory command referring to an address in memory.

The memory controller 250 is connected to the system processors 110 via a bus system 120, 160 which may comprise one or more internal buses 120 and one or more external buses 160 for rapid intercommunication between the processors 110, the memory subsystem 150 and I/O devices 170. The architecture of FIG. 2 is slightly modified from that of FIG. 1 in that there may be a cache system 130 associated with and included with each system processor 110, and each system processor may communicate directly with I/O devices 170 on either or both an internal bus 120 and an external bus 160. The memory subsystem 150 of FIG. 2 may be connected not only to the workstation controller 180 and the storage controller 190 (shown in FIG. 1), it may also be connected to a nodal interconnect 210 including a network switching fabric of local or distant processors or other memory controllers 250 and other devices 220 having such functions as-monitoring bus-or other communication network traffic, compression and decompression of data which may be internal or external to the memory controller 150 and may or may not be located between storage controller 190 and memory subsystem 150. The embodiment of FIG. 2 also illustrates memory subsystem 150 connected directly through the bus network 120, 160 with 110 devices 170 to communicate through I/O ports 270. It is presumed that memory subsystem 150 has been optimized for interleaving and bandwidth.

Figure 3:
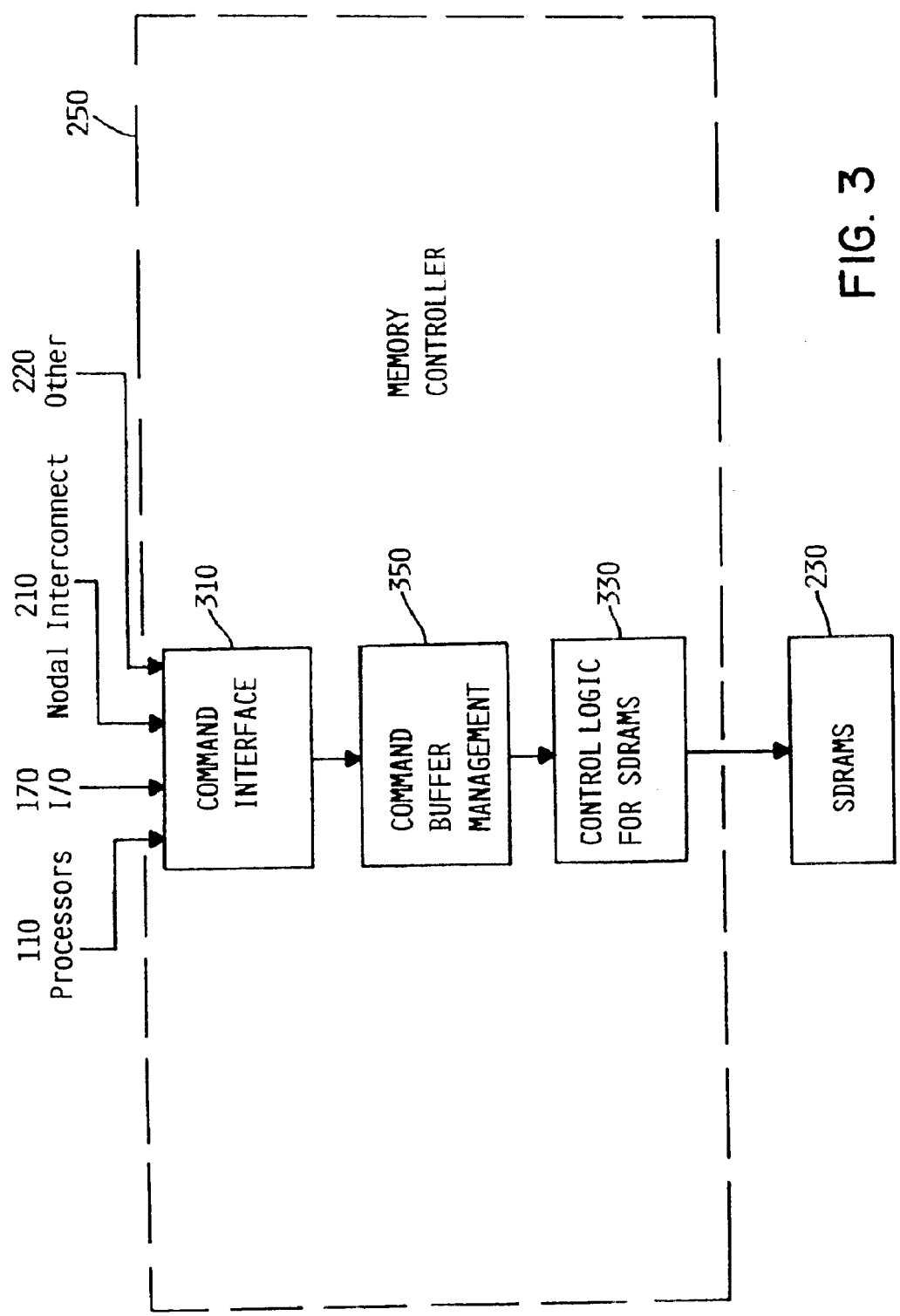
FIG. 3 is a simplified block diagram of a memory controller of a computer memory subsystem.

FIG. 3 is a simplified block diagram of the memory controller 250. Connected either directly to the memory controller 250 or through an internal/external bus network 120, 160 are the processors 110, the I/O devices 170, the nodal interconnect 210, other functional devices 220 to monitor traffic or to facilitate compression/decompression of data, etc. Other bus units not shown which provide memory commands to the memory controller 250 may also be provided. Memory controller 250 may have a command interface 310 to collect, collate, and configure commands to transfer data to/from the bus units in accordance with the various protocols of the bus architecture 120, 160 or the various attached devices and functions 110, 170, 210, 220. The command interface 310 is connected to the command buffer management 350 to be described in further detail. It is sufficient for now to say that the command buffer management 350 embodies the reordering and flush aspects of the invention and other functions of memory subsystem management. Connected to the command buffer management 350 is the control logic 330 for the memory cards 230 to actually receive and transfer data and information from/to memory cards 230.

There are many memory commands which can be used in accordance with the command reordering principles of the invention. Commands may be typed by the specific memory command, e.g., FETCH, STORE, READ/MODIFY/WRITE. Commands may also be typed by the source of the command or by the function embodied in the command. By way of example only, commands may be typed if they are cache-to-cache transfers or if they arise from a command source, such as a particular processor, an I/O hub, a compression engine, etc. Commands may be typed according the process, application, or the activity associated with the command, e.g., compression, I/O, or other priority markers. In an embodiment of the memory subsystem 150 preferably for commercial and business computing applications, three types of commands are considered: a STORE command; an INTERVENTION STORE; and a FETCH command. A STORE command is one in which data is stored to an address in memory 230. An INTERVENTION STORE command relates particularly to cache management and occurs when another processor modifies or otherwise has the most recent up-to-date copy of the data associated with a memory address in its cache system, the processor intervenes and data is retrieved from the cache rather than from the address in the memory subsystem. A copy of the most recent data in the cache is also stored to the memory subsystem. A FETCH command requests data from an address in memory 230.

Figure 4A:
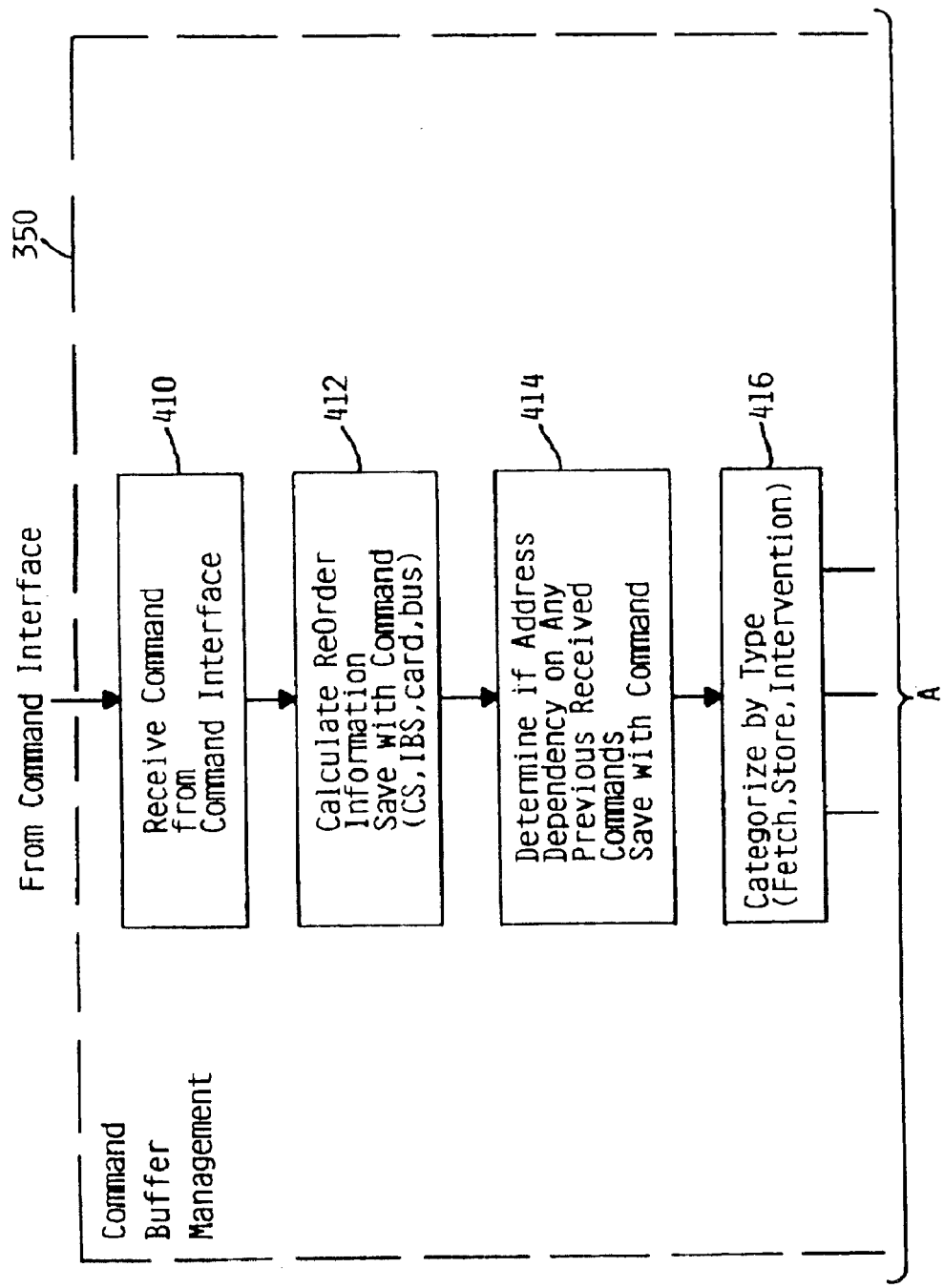
FIG. 4 is a simplified block diagram of a command buffer management logic of the memory controller that can take advantage of principles of the invention herein.
Figure 4B:
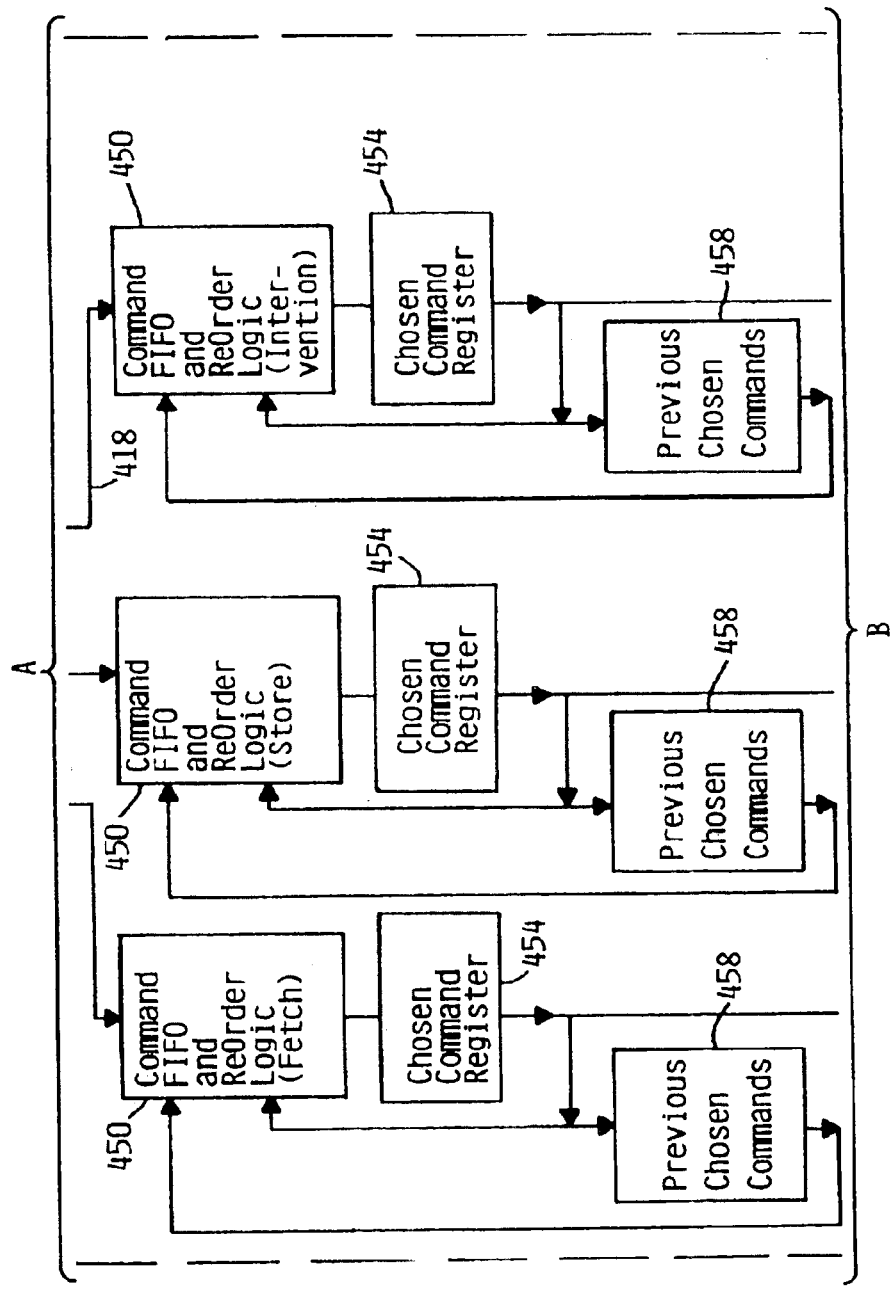
Figure 4C:
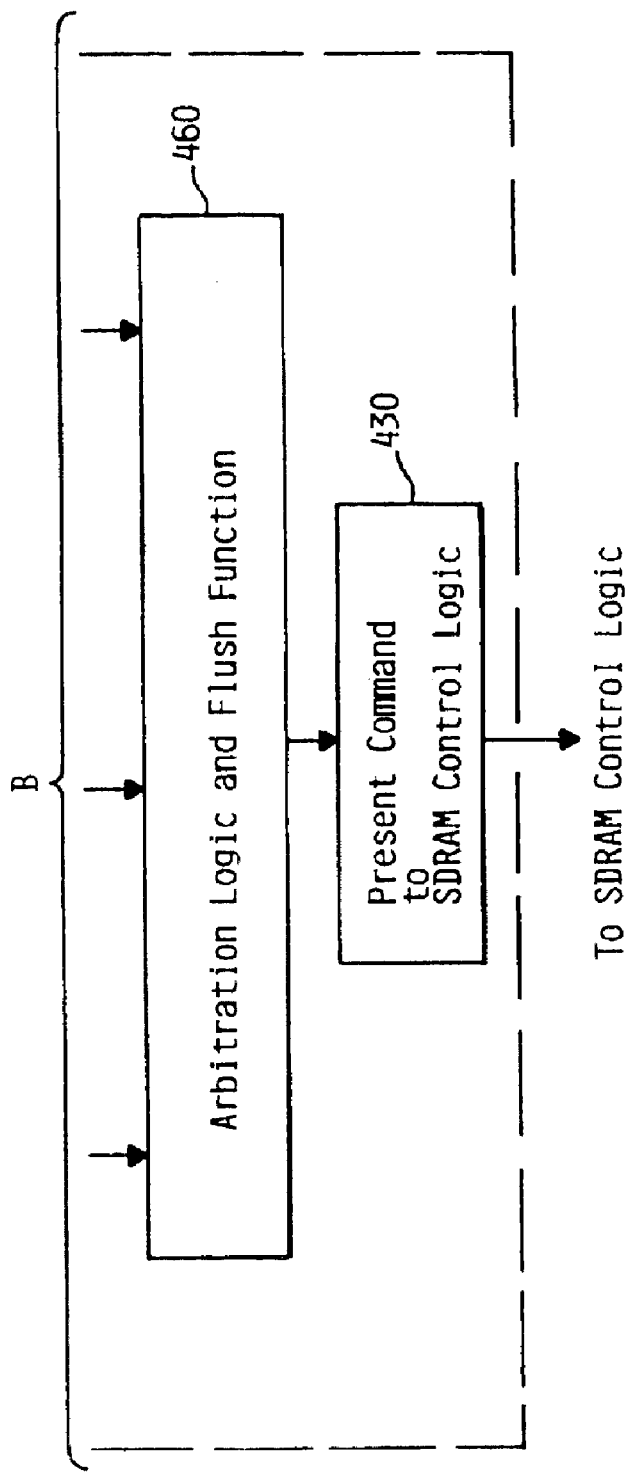

The elements and functions of the command buffer management 350 of the memory controller 250 are illustrated in more detail in FIG. 4. Commands are received from the command interface 310 at block 410. In block 412, information associated with a command is derived and is passed along with the command in the form of additional bits/bytes of information accompanying the data through the command buffer management 350. The information derived in block 412 relates to the physical location in the memory subsystem 150 of the address associated with the received command. The specific memory bus within the memory subsystem must be ascertained, followed by determination of the memory card on the bus; then a memory chip associated with the address is selected, i.e., chip select (CS); and lastly, the internal memory bank on the chip associated with the address is selected, i.e., internal bank-select (IBS). This physical location is encoded into the command and accompanies the command through the process in accordance with an embodiment of the invention to calculate memory cycle penalties.

In block 414, any address dependencies associated with the command are determined and again, this information is encoded with the command for further use by the reordering aspect of the invention. Address dependencies arise when a command cannot execute until a previously received command completes. For example, given a command STORE command to an address in memory, followed by a FETCH command to the same address. It is desirable that the FETCH command wait until the STORE command completes so that the FETCH command receives the most recent data.

In block 416, the commands are categorized by type. Once categorized, each command of a particular command type is input at 418 into its respective command FIFO and reorder logic block 450. In the embodiment described herein, the commands of interest include FETCH, STORE, and INTERVENTION STORE, although other command types may be selected depending upon the particular computer architecture and the particular applications, as discussed above. Thus, it is intended to be an aspect of the invention to modify the types of commands that can be reordered as described herein by reprogramming the registers and the logic associated therewith. Also considered and added to the command information in block 416 may be the priority of the command, or a priority given the source or the application program generating the command, etc. After the command type and other command or source priority information is added to the command, the command is forward to its respective first-in, first-out (FIFO) queue at step 418.

For each command type, there is a command FIFO and reorder logic 450, a chosen command register 454, and a previous chosen command register 458. The structure and function of each of these components are the same given a command type, therefore, the structure and functions of these components will be described for only one command type with the understanding that any other command FIFO and reorder logic 450, chosen command register 454 and previously chosen command register 458 have analogous structure and function.

After the commands have been separated by type, the FETCH commands are routed to its FETCH command FIFO and reorder logic 450. The STORE commands are routed to its STORE command FIFO and reorder logic 450; and the INTERVENTION STORE commands are routed to its respective INTERVENTION STORE command FIFO and reorder logic 450. Once a FETCH command is selected based on logic within the FETCH command FIFO and reorder logic 450 to be described, the selected command is input into the chosen command register 454 wherein it is output to the arbitration logic and flush function 460 and eventually presented to the SDRAM control logic at block 430. A history of the previously executed command is retained in the previously chosen command register 458.

Figure 5A:
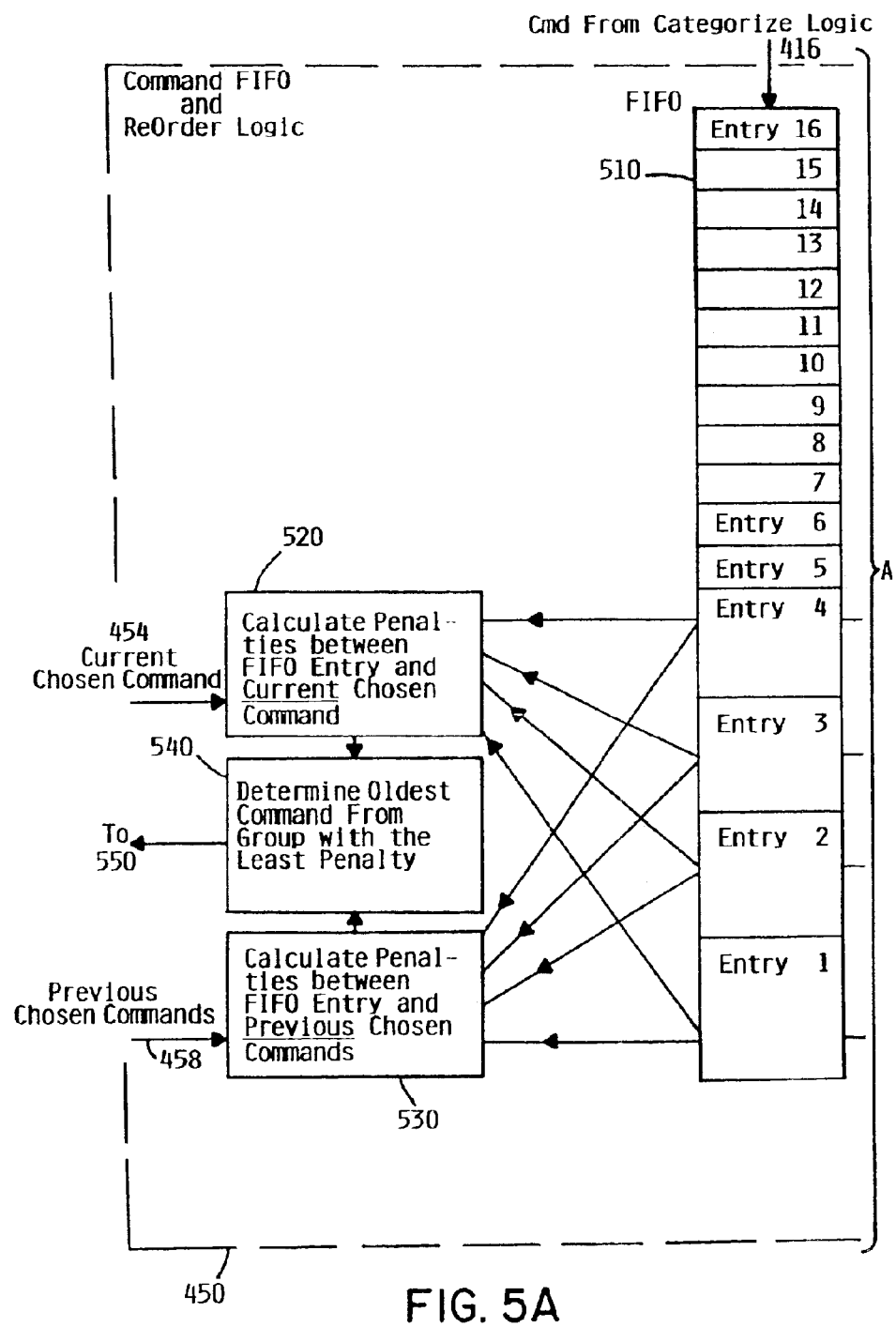
FIG. 5 is a simplified block diagram of the command FIFO and reorder logic of the command buffer management that can be used in accordance with principles of the invention. It is suggested that FIG. 5 be printed on the cover of the patent.
Figure 5B:
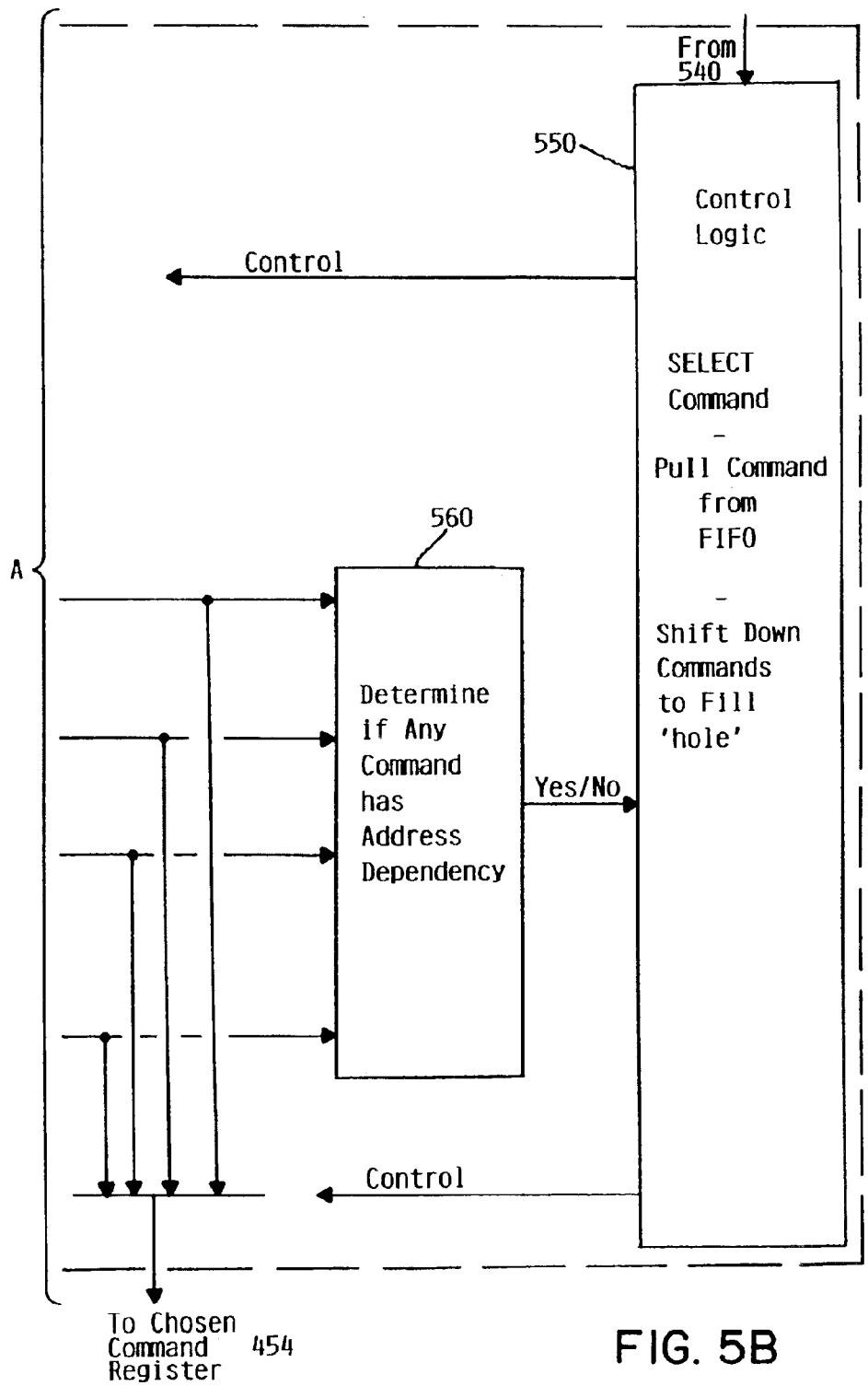
Figure 6A:
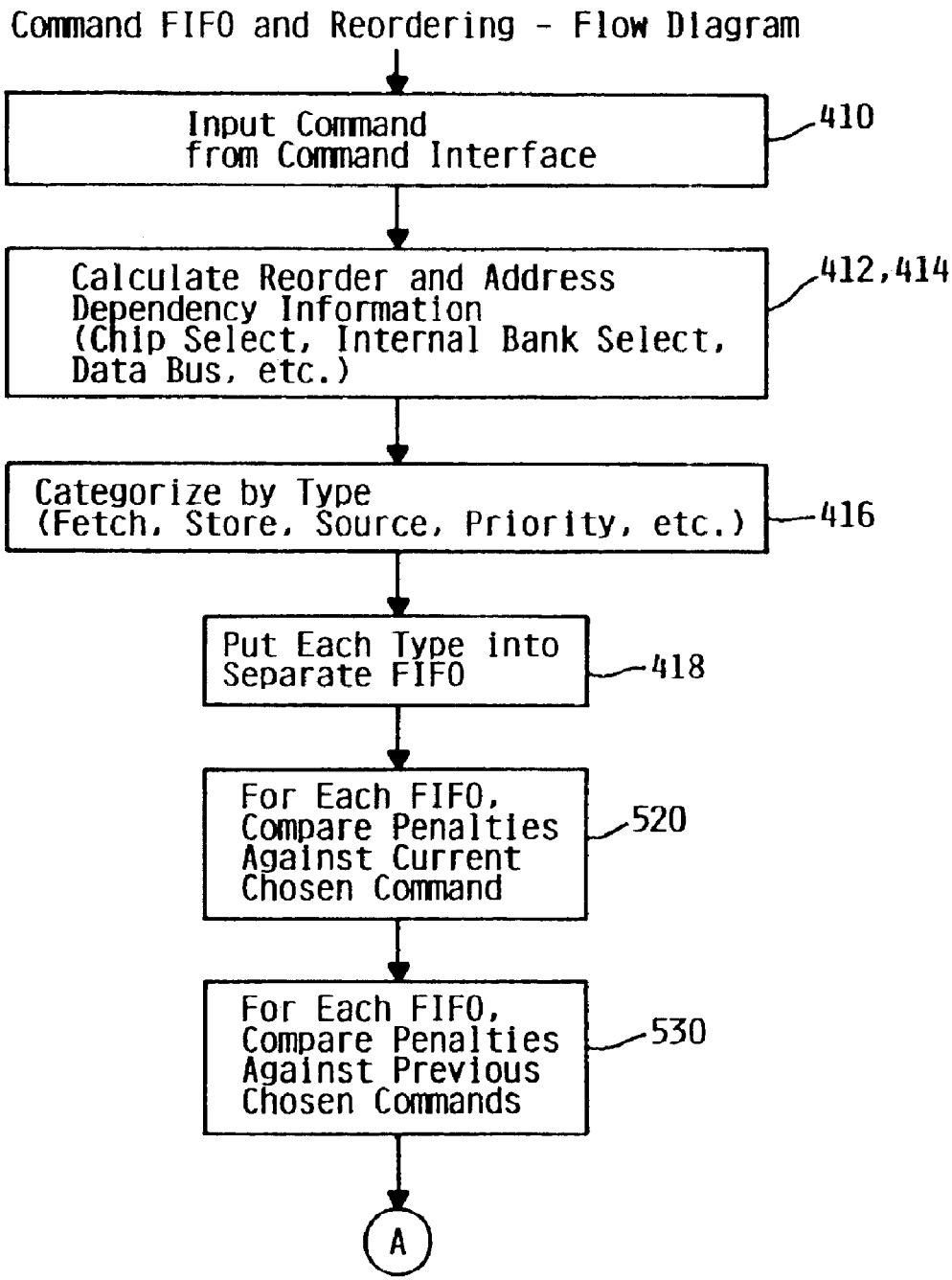
FIG. 6 is a simplified flow chart of a method to reorder memory commands in accordance with principles of the invention.

FIG. 5 is a simplified block diagram of the physical or virtual embodiment of the command reordering logic to implement the corresponding command reordering process step of FIG. 6. When a process step of FIG. 6 is either embodied in hardware or as coded software or a combination thereof represented by a block in FIG. 5, the process step of FIG. 6 has the same numeral as the corresponding block in FIG. 5. The structure and function of the command FIFO and reorder logic 450 of each command type will be described with reference to FIGS. 5 and 6. A command has been received into the memory subsystem 150 in block 410, its physical location and address dependency has been ascertained and encoded with the command as in blocks 412 and 414, and its command type has been determined in block 416 as described with respect to FIG. 4. The massaged and categorized command now enters its respective command FIFO and reorder logic block 450 where it is first placed in a FIFO queue 510 having an arbitrary number of entries, sixteen of which are illustrated in the embodiment described herein. The first or oldest four commands are then compared with each other and with previously chosen commands to determine if any of the four oldest commands in the FIFO will be reordered because of cycle penalties in accordance with the invention. One can appreciate that for other implementations, a FIFO having more or less entries may be appropriate, as well as the number of commands in the FIFO chosen for comparison of cycle penalties.

A memory cycle penalty refers to the time required for the memory subsystem to be ready to execute a subsequent command immediately following a previous command. A precharge penalty exists when a memory command accesses an address on the same memory bus, the same memory card, the same memory chip and the same internal bank than the last previously executed memory command. The precharge penalty results because the voltage levels of the row and column address select circuits must return to at least a threshold level before a subsequent access to the memory bank occurs in order to prevent error in accessing a particular memory cell of a memory bank. By way of example only, the precharge penalty associated with a back-to-back access to the same internal bank is on the order of three to five memory cycles. Thus, in order to access the same internal memory bank immediately following a previous access, the memory subsystem remains idle for three to five cycles until the voltage levels of the address select lines stabilize at or below their thresholds. Other penalties occur when the subsequent memory command must access either a different memory chip on the same memory card, or the command must access an address on a different memory card. This penalty is referred to a memory bus switching penalty or a driver switching penalty. Typically, the switching penalty is approximately one cycle and is usually less than the precharge penalty.

By comparing the precharge and/or the driver switching penalty of each of the oldest four commands in the FIFO 510 with the memory cycle penalties of the current chosen command 454 and with the penalties of the previously chosen commands 458 and taking into account address dependencies of the oldest four commands in the FIFO 510 as in block 560, the commands may be reordered to optimize memory subsystem performance in accordance with an embodiment of the invention. Referring to FIG. 5 together with FIG. 6, the command prioritizing and reordering aspects of the invention will be described. As discussed previously with respect to FIG. 4, the commands in each of the FIFOs 510 are all of the same type. FIFO 510 in FIG. 5 is shown as having sixteen entries wherein the bottom entry is the oldest and the command in entry sixteen is the most recently received command. A number of commands which in the embodiment described herein is the four oldest commands, are selected for penalty comparison in blocks 510 and 530 of FIGS. 5 and 6. In block 520, the four oldest commands selected from the FIFO 510 are compared with the current command in the chosen command register 454 to determine the cycle penalty of the four oldest commands selected from the FIFO 510. In block 530, the four oldest commands selected from FIFO 510 are compared with a number of the previous chosen commands stored in the previous chosen command register 458, again to determine the cycle penalty of the four oldest commands. In block 540, the four oldest commands selected from FIFO 510 are compared amongst each other to determine which has the least cycle penalty and which is the oldest.

There are several methods by which memory cycle penalties of commands can be compared in blocks 520, 530, and 540. An arithmetic method may actually ascribe a number to the cycle penalties of each and perform a calculation by subtracting/adding the number of penalty cycles per command. Another preferred logical method by which the memory cycle penalties of the commands are compared and a determination is made of the commands having the least penalty is by process of elimination. First, those commands having precharge penalties are eliminated because these precharge penalties result in the memory subsystem being idle the longest. Of the remaining commands, those commands having driver switching penalties are eliminated. Those commands that remain then have no penalty associated with them, such as commands which access a different internal bank select on the same memory chip. Of the four oldest commands selected from the FIFO, any existing address dependency is determined in block 560. That is, if one of the commands above is dependent upon another command executing first, then in block 610, the command in the FIFO that is the oldest is selected as the chosen command for entry into register 454. If none of the four oldest commands selected from the FIFO 510 have an address dependency, then a query is made at block 540 to determine if there is more than one command having the least penalty. Of course, if there is only one of the four commands selected from the FIFO having a minimal cycle penalty, that command is selected in block 540b, pulled from the FIFO in block 654 and commands in the FIFO are shifted down to retain ordering based on age. If there is more than one command having a minimal penalty as in block 540, then the command that is the oldest is selected as in block 540a and pulled from the FIFO as in block 654. The command that is selected is stored in the chosen command register 454 to be output to the arbitration and flush function logic 460. Criteria other than selecting the oldest command, such as considering the source of the command, the activity associated with the command, or other priority marked received with the command, may also be used to determine which command of those having the same performance penalty is to be selected.

Figure 7A:
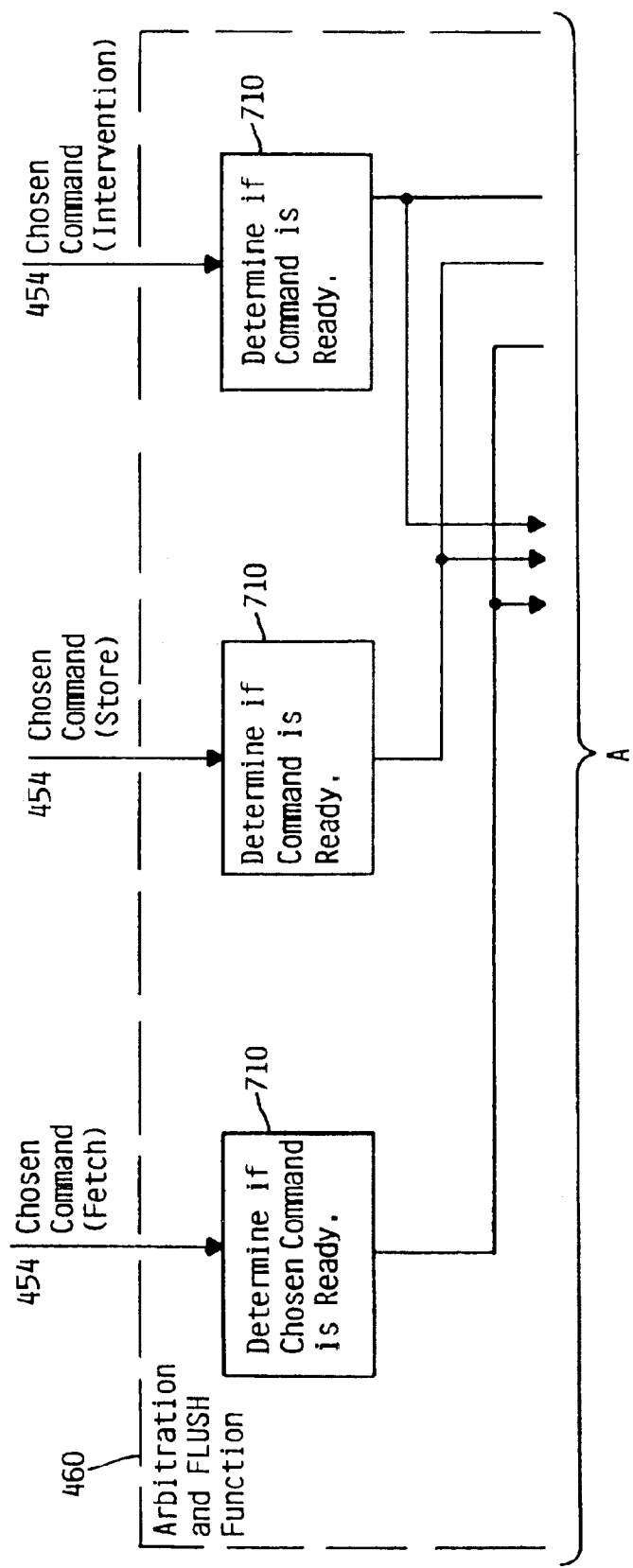
FIG. 7 is a simplified block diagram of the arbitration logic and queue flush function of the command buffer management that can be used in accordance with principles of the invention.
Figure 7B:
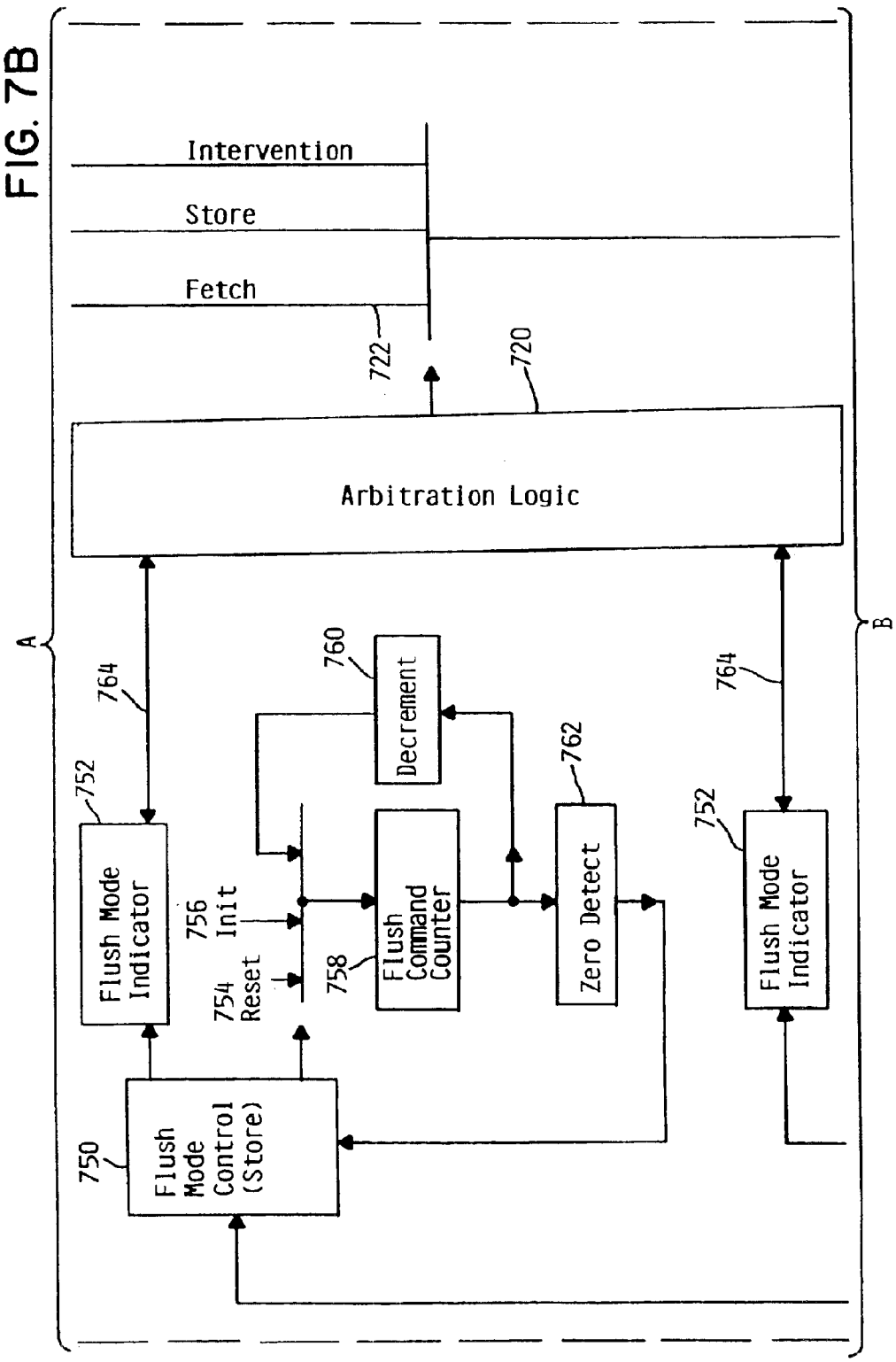
Figure 7C:
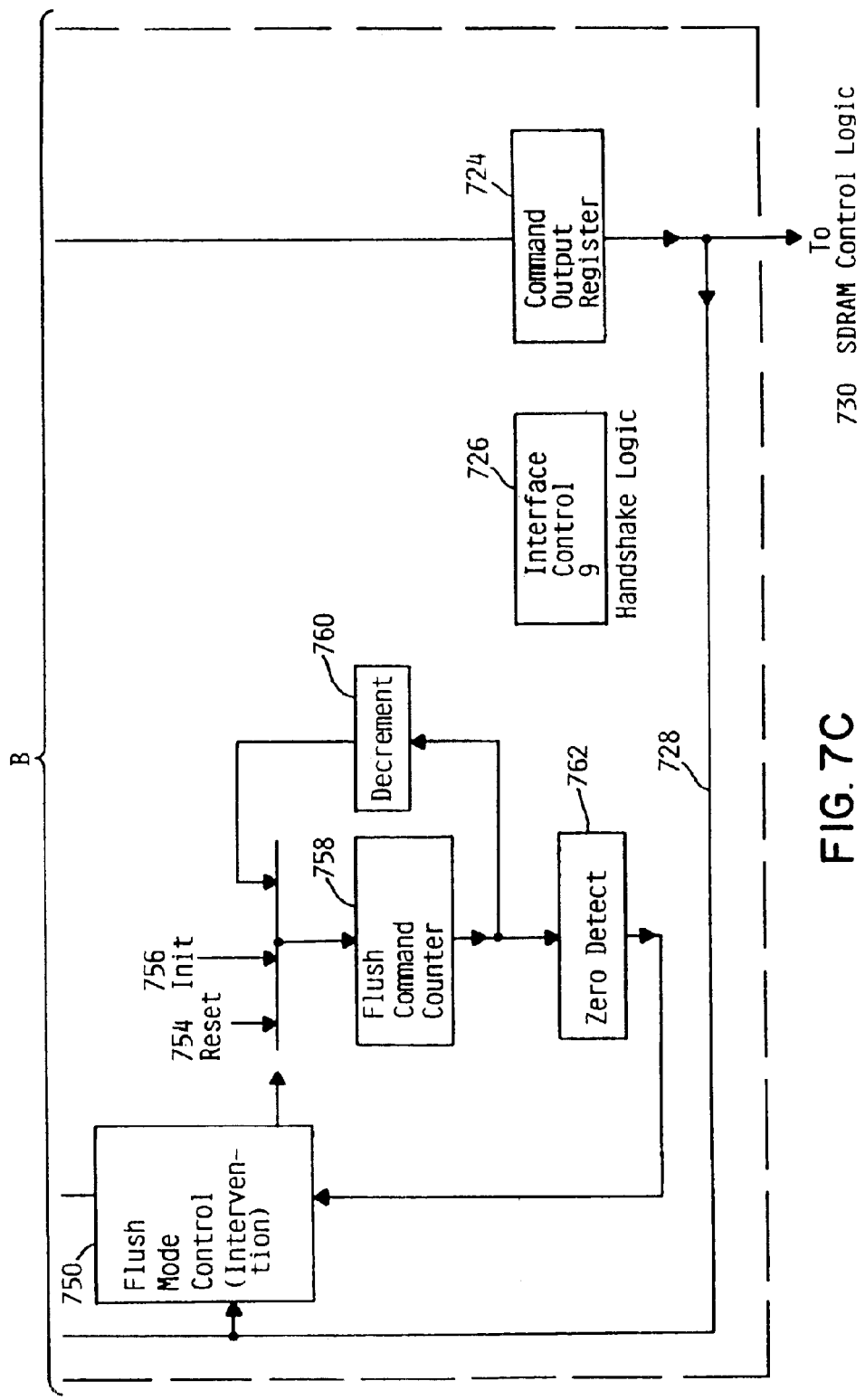
Figure 8:
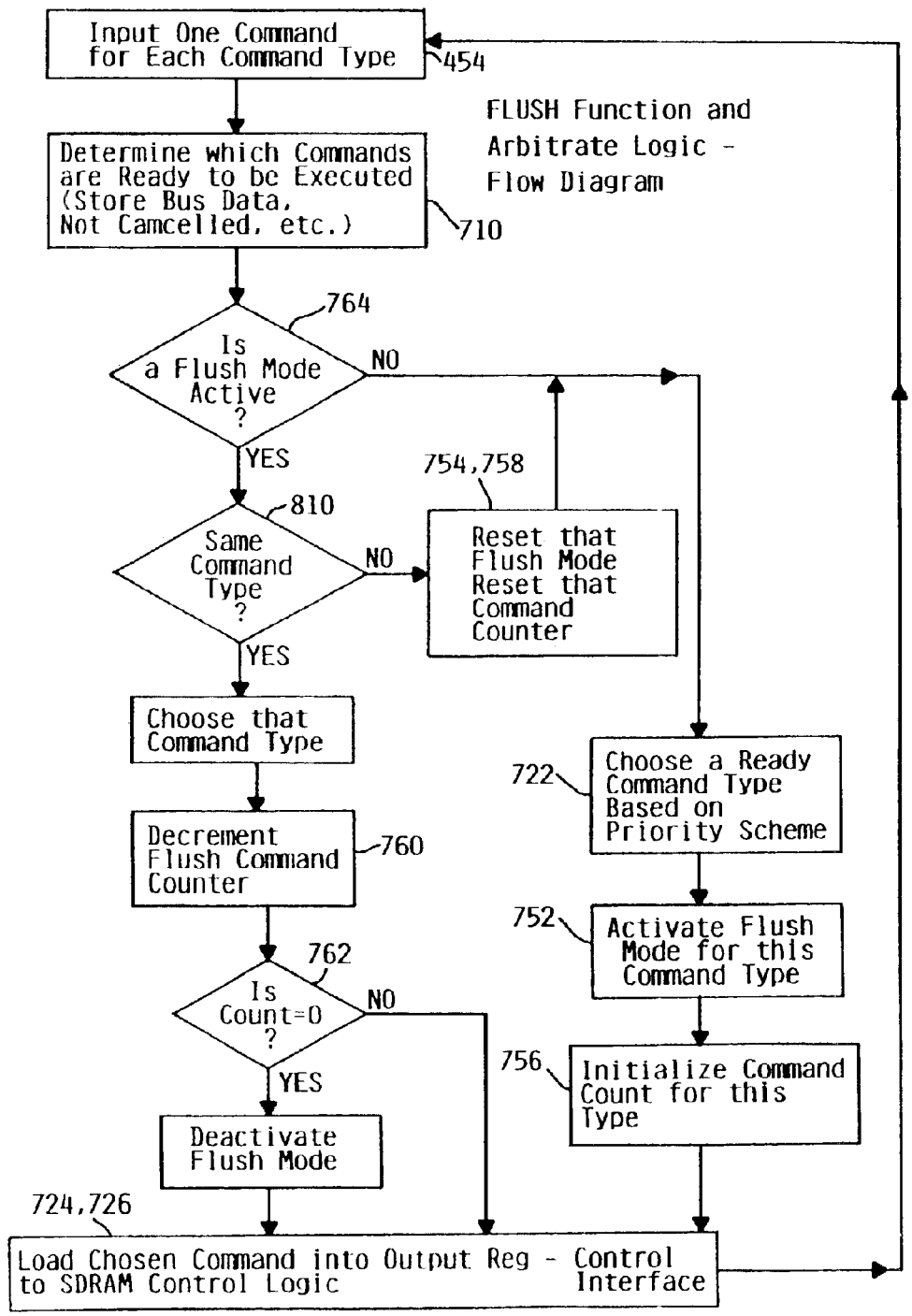
FIG. 8 is a simplified flow chart of a method to flush a command queue and logic of arbitration of a command in accordance with principles of the invention.

FIG. 7 is a simplified block diagram of the physical or virtual embodiment of the queue flush logic to implement the corresponding queue flush function of FIG. 8. Where a queue flush process step of FIG. 8 is either embodied in hardware or coded as software or a combination thereof represented by a block in FIG. 7, the process step of FIG. 8 will have the same reference numeral as the corresponding queue flush block in FIG. 7. The structure and function of the queue flush function and arbitration logic 460 will be described with reference to FIGS. 7 and 8. A command from the chosen command register 454 of each command type is input into the arbitration and flush function logic block 460. One aspect of arbitration logic 710 is to determine if each input command is valid. A command is valid if four conditions are met: (1) the command has been properly received from a system bus unit; (2) a system bus unit has not canceled the command; (3) the data associated with the command has also been received, that is, not just an address has been received; and (4) no address dependency exists for this command meaning that all other commands required to execute first have been executed. One skilled in the art will realize that there may be more or less or other conditions that can determine the validity of the command depending upon the implementation and application in which the memory-subsystem is embodied. The invention contemplates the inclusion of these other conditions for the determination of a valid command. These valid commands are then input into the arbitration logic 720.

Arbitration logic 720 includes any arbitration scheme recognized by one skilled in the art for selection of a command from several sources. Examples of arbitration schemes that have been implemented in memory controllers include a specific priority scheme based on the command type, the process generating the command, or the processor associated with the command, the source/destination of the command, any other processes dependent upon the completion of the command, etc. Still other arbitration schemes include completing the oldest command first, or a round-robin in which a different command type is executed each memory cycle. It is contemplated that these and other arbitration schemes be within the scope of the invention.

The queue flush function of the invention recognizes that once a command of a particular command type has been arbitrated, the performance of the memory subsystem is enhanced if priority continues to be given to that command type for as long as a valid command exists until a programmable number of commands within that same type are executed. Using the queue flush function in conjunction with the command reordering function described with respect to FIGS. 5 and 6, thrashing can be thus prevented. In the embodiment of the invention described, the queue flush function is utilized only for STORE and INTERVENTION STORE commands because FETCH commands are given priority over STORE and INTERVENTION STORE commands in the arbitration logic 720. Again, the priority of a particular command and whether the queue flush function is applied to that or other types of commands can change according to the architecture of the computer processing system and the memory subsystem and/or the applications. In the particular embodiment presented herein, it is preferred that the queue flush function has priority over the FETCH commands. It is also preferred that the number and type of commands to which the queue flush functions are applicable be programmable.

For each of the command types which participate in the queue flush function, there exists a flush mode control 750, a flush mode indicator 752, an initialization 756 and a reset 754 of a flush command counter 758. The flush command counter preferably is set to be the number of entries in the FIFO 510 shown in FIG. 5. There also exists a decrementer 760 and a zero detect 762. Input into the queue flush function logic includes output from the command output register 724 along path 728 and a feedback 764 indicating that the flush mode function for a particular command type is enabled or disabled.

The FIFO queue flush function will now be described. The arbitration logic 720 outputs a control signal 722 to choose a valid command from one of the types allowed by the memory system, i.e., the arbitration logic 720 chooses one of a FETCH, STORE, or INTERVENTION STORE command based on its arbitration and priority scheme and outputs the command to the command output register 724. At the same time, arbitration logic enables the flush mode indicator 752 along control path 764 to initialize 756 the flush command counter 758 for that command type. For each cycle, the flush mode control 750 of each command type monitors each command selected on that cycle through the command output register 724 to determine if the selected command is of its respective type at block 810. When the command is of same type, the flush mode control 750 decrements 760 the flush command counter at block 760. If the command output along path 728 from the command output register 724 is of a different type, the flush mode control 750 outputs a reset signal 754 to the flush command counter 758 and notifies that flush mode indicator 752 that the command type has changed at 754. Initialization 756 of the flush command counter 758 occurs when the first command of a particular type is received at the flush mode control 750. The flush mode indicator 752 notifies the arbitration logic 720 that flush mode is activated for that command type and priority is then given to valid commands of that command type. Another valid command of that command type is selected and output to the command output register 724 with input to the flush mode control 750 of each command type along path 728. The decrementer 760 of the command type continues to subtract the number of commands of that type until either the counter reaches zero. Thus, the FIFO queue 510 of a particular command type can be flushed based on the reordering priority unless arbitration logic 720 intervenes with a different priority scheme in which case arbitration logic provides feedback 752 to disable the flush mode for that command type. When a command type other than the command type for which the flush mode was enabled is output to the command output register 724 and detected on path 728, the flush mode control 750 disables the flush mode for its respective command type, resets the counter 754 and notifies arbitration logic 720 on feedback path 764.

The queue flush function allows the memory subsystem to take greatest advantage of the command reordering. Command reordering permits the command with the least cycle penalty to be completed next. Without a flush function, arbitration may cause thrashing by alternating between STORE and FETCH commands. When the memory subsystem switches between STORE and FETCH commands on alternate cycles, the direction of the data bus also switches. A dead cycle is inserted between STORE and FETCH commands to allow the data bus to stabilize. Thus a performance penalty of one memory cycle exists under these conditions and the efficiency obtained from command reordering may be compromised. This thrashing may be reduced using a flush function to select the same command type for several commands.

FIG. 9a illustrates how a deadlock condition can occur with command reordering. FIFO queue 910 stores a plurality of FETCH commands in which FETCH command M has the same cache line as STORE command S but which was received after STORE command S. FETCH command M was chosen as the FETCH command with the least cycle penalty. FETCH command M, however, has an address dependency on STORE command S in the STORE command FIFO 920. STORE command S, however, cannot execute until STORE command U executes. The address for STORE command U is the same cache line as FETCH command O and STORE command U was received after FETCH command O. STORE command U was chosen as the STORE command having the least cycle penalty of the STORE commands in the STORE command FIFO 920. STORE command U, moreover, cannot execute because it has an address dependency on FETCH command O. FETCH command O cannot execute until FETCH command M executes but FETCH command M cannot execute because it is dependent upon STORE command S. STORE command S cannot execute until STORE command U executes but STORE command U cannot execute until FETCH command O executes. The deadlock continues and the memory subsystem cannot make forward progress because neither a FETCH or a STORE command can execute.

Deadlock can be prevented by suspending the reordering and using the address dependency information to return to a true FIFO behavior as illustrated in FIG. 9b. In FIG. 9b, the same address dependencies as above exist but if the oldest command in each FIFO executes first, deadlock is avoided. For example, using the queue flush function, the STORE commands in the STORE FIFO will execute until STORE command U is reached. Note that STORE command S is older than STORE command U and will thus be executed in order. When STORE command U is encountered, it cannot execute because it has an address dependency on FETCH command O. Execution will thus switch to the FETCH command FIFO until another address dependency occurs or some other reason. Note that FETCH command M could execute because the command upon which it was dependent, STORE command S, had already executed.

While various embodiments of the present invention have been described above, it should be understood that they have been presented by way of example, and not limitation, and variations are possible. One of ordinary skill in the art would know that one can use more or less or use different types of commands for command reordering than has been presented in the preferred embodiments. The number of commands, as well as the size of the command FIFOs, presented for comparison of performance penalties can be programmed for optimal performance. Engineering and scientific computing may have different priorities for different command types than commercial and business computing which grants priority to FETCH commands. One of ordinary skill in the art could adjust the queue flush function counter value and could increment up to some limit, rather than decrement to zero. Thus, the breadth and scope of the present invention should not be limited by any of the above-described exemplary embodiments, but should be defined only in accordance with the following claims and their equivalents.

What is claimed is:

1. A method to process commands in a computer memory subsystem, comprising:
   (a) receiving a plurality of memory commands on a bus connected to said computer memory subsystem and determining the physical location of the memory command in memory, and further determining if any of said received memory commands have an address dependency and passing said physical location and said address dependency, if any, corresponding to said memory command along with said memory command;

(b) categorizing said received commands into command types based on one of the following: STORE, FETCH, INTERVENTION STORE; the source or destination of said received memory commands; the program or application from which said memory commands originate or are otherwise required;

(c) determining memory cycle performance penalties of said categorized commands by comparing a number of oldest received categorized commands with each other, with a currently chosen command, and with a previously chosen command;

(d) reordering said categorized commands so that said categorized commands having the least memory cycle performance penalty are selected for execution and if more than one categorized command has the least memory cycle performance penalty, then selecting the oldest of said reordered commands for execution;

(e) determining if said reordered commands are valid;

(f) granting priority to said type of command having said least memory cycle performance penalty;

(g) executing sequential valid commands of the same command type until a valid command of the same type is not received or until a predetermined number has been executed, or until a memory command of another type has higher priority;

(h) avoiding deadlock when an address dependency exists between commands of different types by executing commands having the command type of the oldest memory command.

2. The method of claim 1, wherein said source or destination is a particular computer processor connected on said bus network.

3. The method of claim 1, wherein said source or destination is a I/O hub controller functionally connected on said bus network.

4. The method of claim 1, wherein said source or destination is a switching fabric connected to said bus network.

5. The method of claim 1, wherein said source or destination is a compression/decompression engine functionally connected to said bus network.

6. The method of claim 1, wherein said command types which originate from or are required for a particular application have priority.

7. A computer processing system, comprising:

(a) a plurality of bus units, said bus units comprising at least one computer processor, at least one I/O device; at least one memory cache system connected to said at least one computer processor, and at least one network communication device, said plurality of bus units interconnected on a bus network, and said plurality of bus units to issue memory commands, said memory commands categorized into types;

(b) at least one memory subsystem connected on a first bus to said plurality of bus units, said memory subsystem responsive to said memory commands and further comprising:

(i) a memory controller connected to a command interface functionally connected to said first bus;

(ii) a plurality of memory chips configured into memory banks; said memory chips architected into memory cards attached to at least one memory bus;

(iii) a plurality of command FIFO queues, each of said command FIFO queues associated with one of said command types into which said memory commands are categorized;

(iv) a plurality of comparison logic circuits, each of said plurality of comparison logic circuits associated with each of said plurality of command FIFO queues to determine which memory commands of each of said command types have the least memory cycle performance penalty by comparing a number of oldest received categorized commands with each other, with a currently chosen command, and with a previously chosen command;

(v) an arbitration logic circuit to output said memory commands of said determined command type having said least memory cycle performance penalty to said plurality of memory chips.

8. The computer processing system of claim 7, wherein said comparison logic circuit further determines the oldest of said memory commands in each of said plurality of command FIFO queues.

* * * * *

UNITED STATES PATENT AND TRADEMARK OFFICE
CERTIFICATE OF CORRECTION

PATENT NO. : 6,895,482 B1
DATED : May 17, 2005
INVENTOR(S) : Herman Lee Blackmon et al.

It is certified that error appears in the above-identified patent and that said Letters Patent is hereby corrected as shown below:

Title page,
Item [75], Inventors, please add:
-- Michael John Mayfield, Austin, TX (US) --.

Signed and Sealed this

Sixteenth Day of August, 2005

JON W. DUDAS
*Director of the United States Patent and Trademark Office*